US012233822B2

(12) United States Patent
Castellanos et al.

(10) Patent No.: US 12,233,822 B2
(45) Date of Patent: Feb. 25, 2025

(54) VEHICLE SENSOR CLEANING DEVICE THAT PROVIDES AIR AND LIQUID CLEANING STREAMS AND VEHICLE SENSOR SYSTEM

(71) Applicant: FORD GLOBAL TECHNOLOGIES, LLC, Dearborn, MI (US)

(72) Inventors: Carlos Francisco Maciel Castellanos, Pittsburgh, PA (US); Pablo Arturo Zuniga Perez, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 363 days.

(21) Appl. No.: 17/818,871

(22) Filed: Aug. 10, 2022

(65) Prior Publication Data

US 2024/0051501 A1 Feb. 15, 2024

(51) Int. Cl.
B60S 1/56 (2006.01)
B60S 1/48 (2006.01)
B60S 1/50 (2006.01)
B60S 1/52 (2006.01)
B60S 1/54 (2006.01)
G02B 27/00 (2006.01)
H04N 23/51 (2023.01)
H04N 23/52 (2023.01)

(52) U.S. Cl.
CPC .............. B60S 1/56 (2013.01); B60S 1/481 (2013.01); B60S 1/50 (2013.01); B60S 1/52 (2013.01); B60S 1/54 (2013.01); G02B 27/0006 (2013.01); H04N 23/51 (2023.01); H04N 23/52 (2023.01)

(58) Field of Classification Search
CPC .............................. B60S 1/56; B60S 1/00–62
See application file for complete search history.

(56) References Cited

U.S. PATENT DOCUMENTS

| 10,744,979 | B2 | 8/2020 | Schmidt et al. |
| 11,001,270 | B2 | 5/2021 | Dakemoto |
| 11,110,899 | B2 * | 9/2021 | Fukazawa .......... H01M 8/04111 |
| 2015/0203077 | A1 * | 7/2015 | Gokan ...................... B05B 7/08 |
| | | | 134/102.2 |
| 2022/0126790 | A1 * | 4/2022 | Matsunaga ............... B60S 1/54 |
| 2024/0217485 | A1 * | 7/2024 | Thebault ................. B60S 1/481 |

* cited by examiner

Primary Examiner — Spencer E. Bell
(74) Attorney, Agent, or Firm — Frank A MacKenzie; Brooks Kushman P.C.

(57) ABSTRACT

A cleaning device for a vehicle sensor includes: a housing having an open first end, an open second end, and a passageway extending between the open first end and the open second end; and at least one nozzle at least partially positioned within the passageway of the housing. The at least one nozzle includes an outlet that provides at least one liquid stream through the open first end of the housing towards a lens or cover of the vehicle sensor. The housing is positioned such that air streams passing through the passageway pass through the open first end of the housing towards the lens or cover of the vehicle sensor with the at least one liquid stream. A sensor assembly and sensor system including the cleaning device are also disclosed herein.

20 Claims, 11 Drawing Sheets

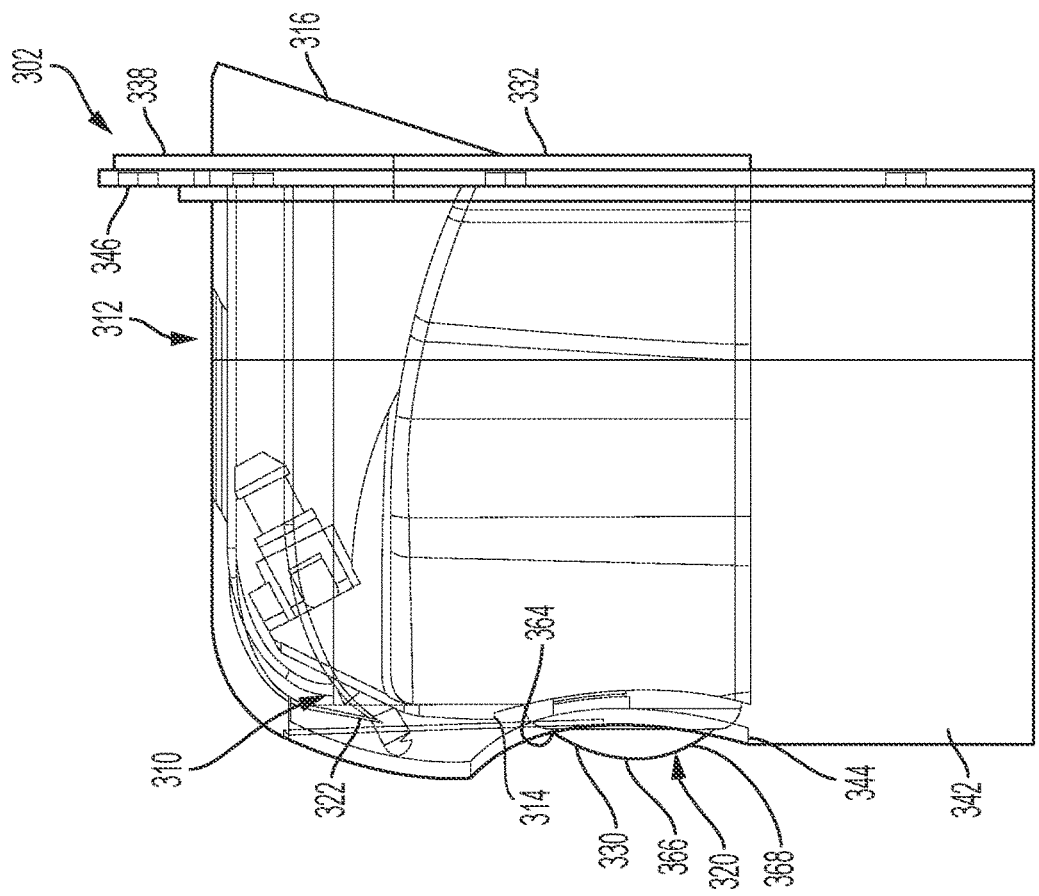
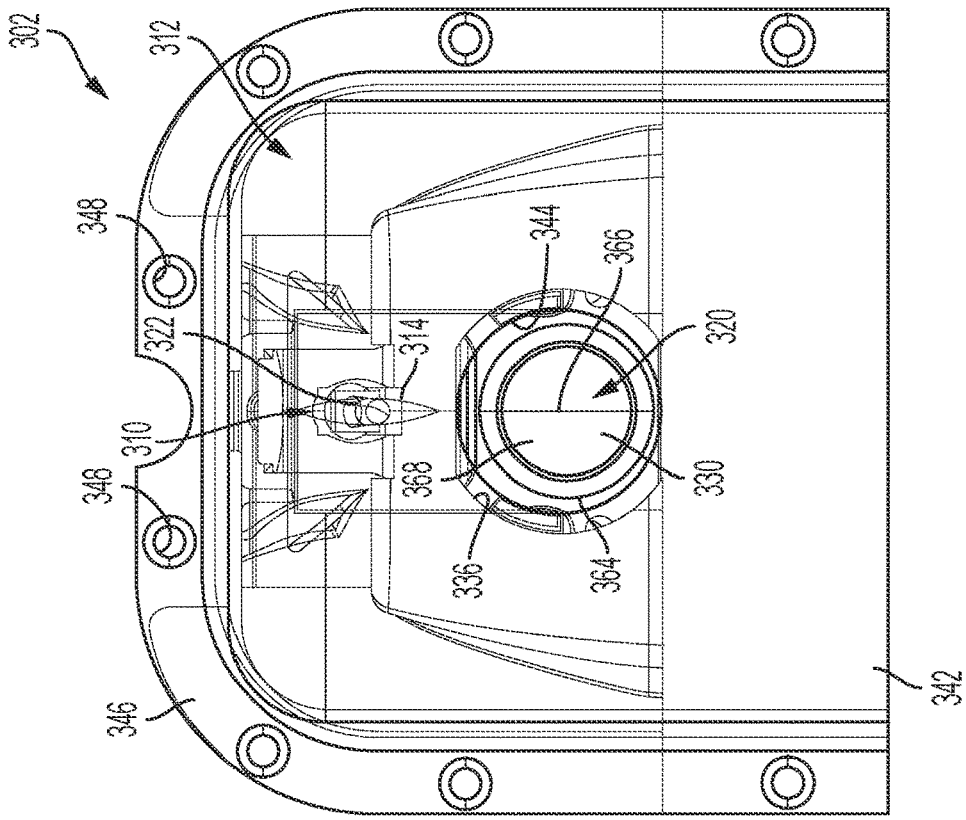
FIG. 3D
FIG. 3C

VEHICLE SENSOR CLEANING DEVICE THAT PROVIDES AIR AND LIQUID CLEANING STREAMS AND VEHICLE SENSOR SYSTEM

TECHNICAL FIELD

This disclosure relates generally to cleaning jets, nozzles, and/or spraying devices for cleaning covers or lenses of vehicle sensors or cameras and, in particular, to a cleaning device and vehicle sensor system that provide a combination of air and cleaning liquid streams over a surface of the sensor cover or lens for removing dust, dirt, and other obstructions from the cover or lens surface.

BACKGROUND

Accurate and consistent detection of structures and road objects/actors can be key elements of autonomous or semi-autonomous driving applications. Typically, an autonomous or semi-autonomous vehicle utilizes various on-board sensors to detect obstacles, other aspects of the roadway, and/or other aspects of an environment around the vehicle, which can be referred to as "perception information" or "perception data" representing the surrounding environment of a vehicle. Examples of such sensors include one or more of vision sensors (e.g., camera(s)), radio detection and ranging (e.g., radar) sensors, and/or light detection and ranging (e.g., LiDAR) sensors. The perception information detected by the on-board sensors is processed and analyzed by image analysis software or a perception system to identify the objects surrounding the vehicle. The objects may include, for example, signaling devices, such as traffic lights, roadway boundaries, other vehicles, pedestrians, and/or obstacles. Accordingly, there is a growing need to provide effective and efficient cleaning solutions to remove obstructions on a sensor surface to improve of sensor accuracy and vehicle autonomy.

SUMMARY

In order to address such issues, the cleaning devices and vehicle sensor systems of the present disclosure are configured to provide a combined or collimated fluid stream comprising a liquid stream and an air stream for removing dirt, dust, and other debris from surfaces of sensor lens or covers. In particular, the cleaning devices of the present disclosure can be configured to provide a continuous or substantially continuous air stream or air curtain over surfaces of the cover or lens. The cleaning devices of the present disclosure can also be configured to provide periodic or temporary liquid bursts or liquid streams combined with, surrounded by, or enclosed within the air streams for washing the lens or cover surface. In some examples, the combined or collimated air and liquid streams can be configured to clean and wash an entire surface of the sensor lens or cover, including areas of the lens or cover that are not directly contacted by the air and liquid streams.

According to an aspect of the disclosure, a cleaning device for a vehicle sensor includes a housing having an open first end, an open second end, and a passageway extending between the open first end and the open second end and at least one nozzle at least partially positioned within the passageway of the housing. The at least one nozzle includes an outlet that provides at least one liquid stream through the open first end of the housing towards a lens or cover of the vehicle sensor. The housing is positioned such that air streams passing through the passageway pass through the open first end of the housing towards the lens or cover of the vehicle sensor with the at least one liquid stream.

In some examples, the at least one liquid stream and the air streams pass through the open first end of the housing as a collimated fluid stream. Further, the at least one liquid stream can project through the open first end of the housing in a direction at least substantially parallel to a direction of the air streams passing through the open first end of the housing. Also, the air streams passing through the passageway can surround the outlet of the at least one nozzle. Further, the at least one liquid stream can pass through a central portion of the open first end of the housing and the air streams pass through peripheral portions of the open first end of the housing.

In some examples, the housing includes a first housing part with the at least one nozzle mounted to the first housing part, and a second housing part at least partially enclosing the first housing part and the at least one nozzle. The passageway can be a space between the first housing part and the second housing part. Also, the open second end of the housing can be configured to be connected to an airflow source that moves air through the passageway of the housing.

In some examples, the at least one nozzle includes an inlet, the outlet, and a liquid channel extending between the inlet and the outlet. The inlet of the at least one nozzle can be configured to be fluidly connected to a liquid reservoir. Further, liquid can pass from the liquid reservoir through the liquid channel as a pressurized fluid stream.

According to another aspect of the disclosure, a sensor assembly includes: a housing having an open first end, an open second end, and a passageway extending between the open first end and the open second end; and at least one nozzle at least partially positioned within the passageway of the housing. The at least one nozzle includes an outlet that projects at least one liquid stream through the open first end of the housing. The sensor assembly further includes at least one camera lens or cover protruding through a camera opening in the housing. The at least one nozzle and the housing are positioned such that the at least one liquid stream passes through the open first end of the housing towards an outer surface of the at least one camera lens. Air streams passing through the passageway pass through the open first end of the housing towards the at least one camera lens along with the at least one liquid stream.

In some examples, the at least one camera lens comprises a convex outer surface. The at least one liquid stream expelled from the at least one nozzle can be directed towards a side portion of the convex outer surface of the at least one camera lens between a peripheral edge of the convex outer surface and a center of the convex outer surface. Also, the at least one nozzle can be at a twelve o'clock position relative to the at least one camera lens. The air streams can direct liquid of the at least one liquid stream over the convex outer surface of the at least one camera lens, such that the liquid passes over both the side portion of the convex outer surface nearest to the at least one nozzle and the side portion of the convex surface that is farthest away from the at least one nozzle.

In some examples, the housing includes a first housing part, with the at least one nozzle mounted to the first housing part, and a second housing part at least partially enclosing the first housing part and the at least one nozzle. The passageway can be a space between the first housing part and the second housing part. A camera can be enclosed within the first housing part with a field of view of the camera passing through the at least one camera lens.

According to another aspect of the disclosure, a sensor system includes a cleaning device for a vehicle sensor. The cleaning device includes: a housing having an open first end, an open second end, and a passageway extending between the open first end and the open second end; and at least one nozzle at least partially positioned within the passageway of the housing. The at least one nozzle includes an inlet, an outlet that projects at least one liquid stream through the open first end of the housing towards a lens or cover of the vehicle sensor, and a channel extending between the inlet and the outlet. The sensor system further includes a liquid reservoir fluidly connected to the inlet of the at least one nozzle containing liquid to be ejected from the outlet of the at least one nozzle forming the at least one liquid stream; an airflow source connected to the second open end of the housing for moving air through the passageway of the housing; and a controller configured to selectively activate the airflow source to move the air through the passageway. The housing is positioned such that air streams passing through the passageway pass through the open first end of the housing towards the lens or cover of the vehicle sensor with the at least one liquid stream.

In some examples, the controller is further configured to periodically cause liquid to be ejected from the outlet of the at least one nozzle. Also, the sensor system can further include a valve between the liquid reservoir and the inlet of the at least one nozzle. In such instances, the controller can be configured to cause the valve to open to cause the liquid to flow from the liquid reservoir to the at least one nozzle.

In some examples, the controller is configured to receive an activation signal from a perception system of the vehicle and to cause the liquid to pass from the liquid reservoir to the at least one nozzle in response to the received activation signal.

BRIEF DESCRIPTION OF THE DRAWINGS

Additional advantages and details are explained in greater detail below with reference to the exemplary embodiments that are illustrated in the accompanying schematic figures, in which:

FIG. 3C is a front view of the vehicle sensor assembly and cleaning device of FIG. 3A;

FIG. 3D is a side view of the vehicle sensor assembly and cleaning device of FIG. 3A;

DETAILED DESCRIPTION

Figure 1A:
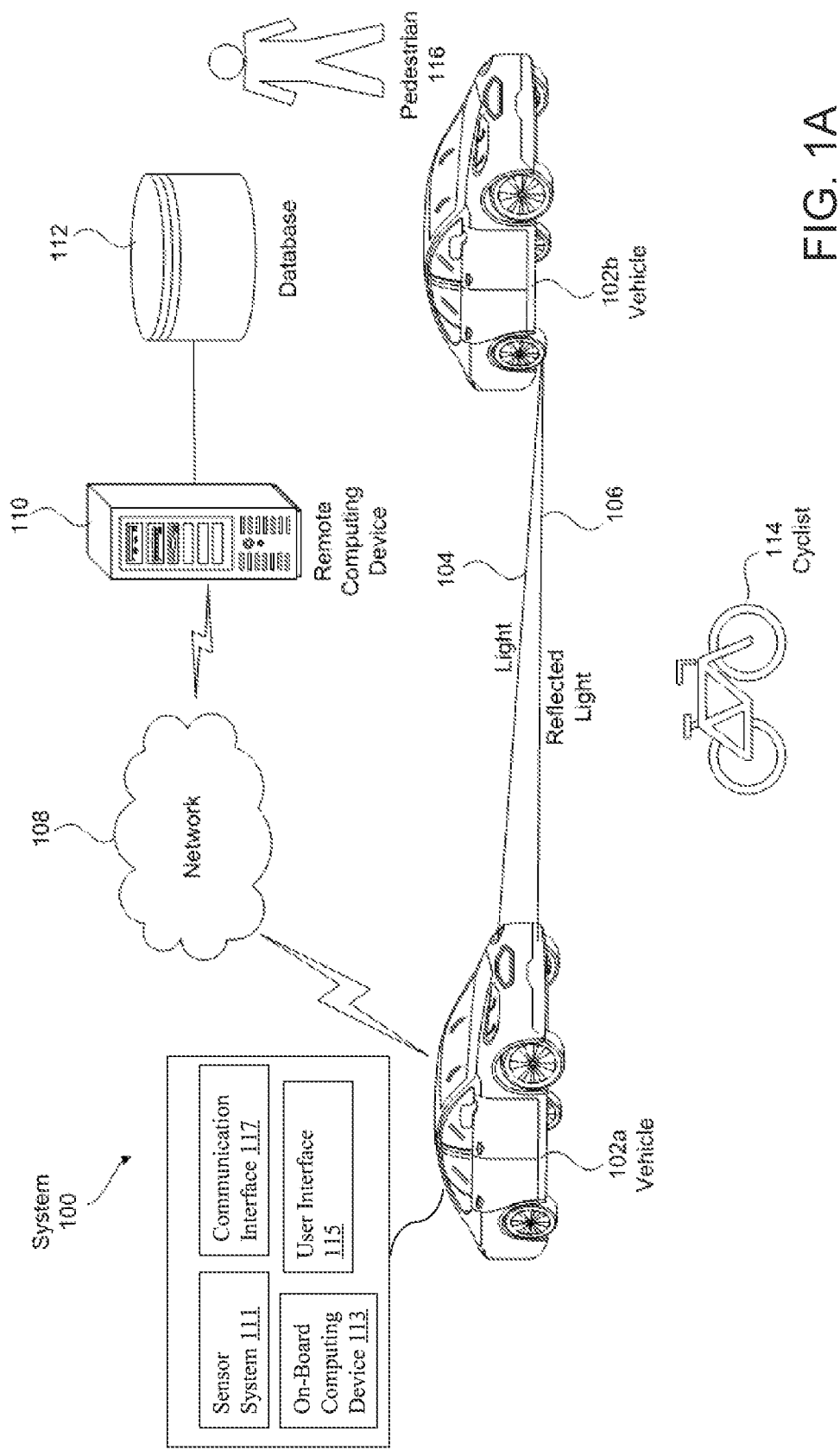
FIG. 1A is a schematic drawing of an exemplary autonomous vehicle system, according to an aspect of the present disclosure.

The following description is provided to enable those skilled in the art to make and use the described embodiments contemplated for carrying out aspects of the present disclosure. Various modifications, equivalents, variations, and alternatives, however, will remain readily apparent to those skilled in the art. Any and all such modifications, variations, equivalents, and alternatives are intended to fall within the spirit and scope of the present disclosure.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

With reference to the figures, the present disclosure is directed to cleaning devices (e.g., cleaning devices 310, 410) for a vehicle sensor or camera, which can be used with a vehicle 102a, such as an autonomous or semi-autonomous vehicle. The disclosure is also directed to a vehicle sensor or camera assembly 302 comprising a support structure, enclosure, or housing for containing the vehicle sensor or camera and the cleaning devices 310, 410. The cleaning devices 310, 410 of the present disclosure can also be integrated with vehicle sensor systems using information detected by the vehicle sensors or cameras to determine when the cleaning devices 310, 410 should be activated.

Cleaning devices, such as the cleaning devices 310, 410 of the present disclosure, may be used with vehicle sensor systems because a field-of-view of onboard optical sensors of the vehicle 102a, such as cameras of the camera assembly 302, can become obscured by dirt, dust, and other debris during operation of the vehicle 102a. These obstructions may affect image quality and collected sensor data. For example, dirt, dust, and other debris can become adhered to an outer surface of lenses or covers of vehicle sensors or cameras of the camera assembly 302, limiting the field-of-view of the sensors or cameras. Conventional vehicle sensors often include cleaning systems and devices for removing dirt, dust, and debris from surfaces of lens or covers of the sensors or cameras. For example, a sensor cleaning system may include an airflow device for providing a continuous or substantially continuous air curtain over an outer surface of the cover or lens for deflecting or directing dirt, dust, and other debris away from the sensor or camera. The continuous or substantially continuous air curtain can reduce a probability that dirt, dust, and debris will be deposited on and/or will become adhered to the outer surface of the cover or lens. Sensor cleaning systems can also include additional devices or elements for improving cleaning capabilities, such as liquid nozzles or jets that provide a stream of cleaning liquid to the outer surface of the cover or cap.

In some conventional cleaning systems, the air curtain and stream of cleaning liquid can be provided by different devices, which can be positioned at different areas of the cover or lens. Due to positioning of the different devices, the air curtain and the liquid stream from the nozzle or jet can contact or attack the cover or lens at different angles reducing effectiveness of the different streams. The positioning of the devices at different positions around the cover or lens also creates multiple obstructions that may limit or restrict a field-of-view of the sensor or camera further reducing image quality and/or limiting data that can be collected by vehicle sensors. The collimated fluid stream provided by the cleaning devices 310, 410 of the present disclosure addresses such limitations.

In particular, in some examples, the cleaning devices 310, 410 of the present disclosure can be configured to provide a combined or collimated fluid stream comprising liquid streams and air streams to an outer surface of a cover or lens of a vehicle sensor or camera to clean and wash dirt, dust, and other debris from the outer surface of the cover or lens. For example, the cleaning devices 310, 410 can be configured to provide a continuous or substantially continuous air stream or air curtain over the outer surface of the cover or lens. The cleaning devices 310, 410 can also be configured to provide periodic or temporary liquid bursts or liquid streams combined with, surrounded by, or enclosed within the air stream for cleaning and washing the lens or cover surface to remove dirt, dust, and other debris. In some examples, the combined or collimated fluid stream comprising the air and liquid streams can be configured to clean and wash an entire surface of the sensor lens or cover, including areas of the lens or cover that are not directly contacted by the air and liquid streams.

In some examples, the cleaning devices 310, 410 of the present disclosure have a reduced package size compared to cleaning systems that comprise separate airflow and liquid ejecting devices. Accordingly, the cleaning devices 310, 410 have a reduced level of optical interference compared to conventional cleaning devices and cleaning systems. Further, the cleaning devices 310, 410 can provide improved cleaning ability by combining or collimating the air and liquid streams, which, as described herein, increases effectiveness particularly of the liquid stream compared to systems in which the air stream and the liquid stream are separate and/or contact the outer surface of the lens or cover at different angles of attack.

The cleaning devices 310, 410 and/or vehicle sensor or camera assembly 302 can be secured or fixed to a portion of an exterior of the vehicle 102a, such as to a roof or another exterior portion of the vehicle 102a. In some examples, the cleaning devices 310, 410 can be positioned on a sensor housing or frame of the vehicle 102a. For example, the cleaning devices 310, 410 of the present disclosure can be positioned slightly above a sensor or camera and positioned to direct streams of liquid and/or air towards the cover or lens or the vehicle sensor or camera.

Figure 1B:
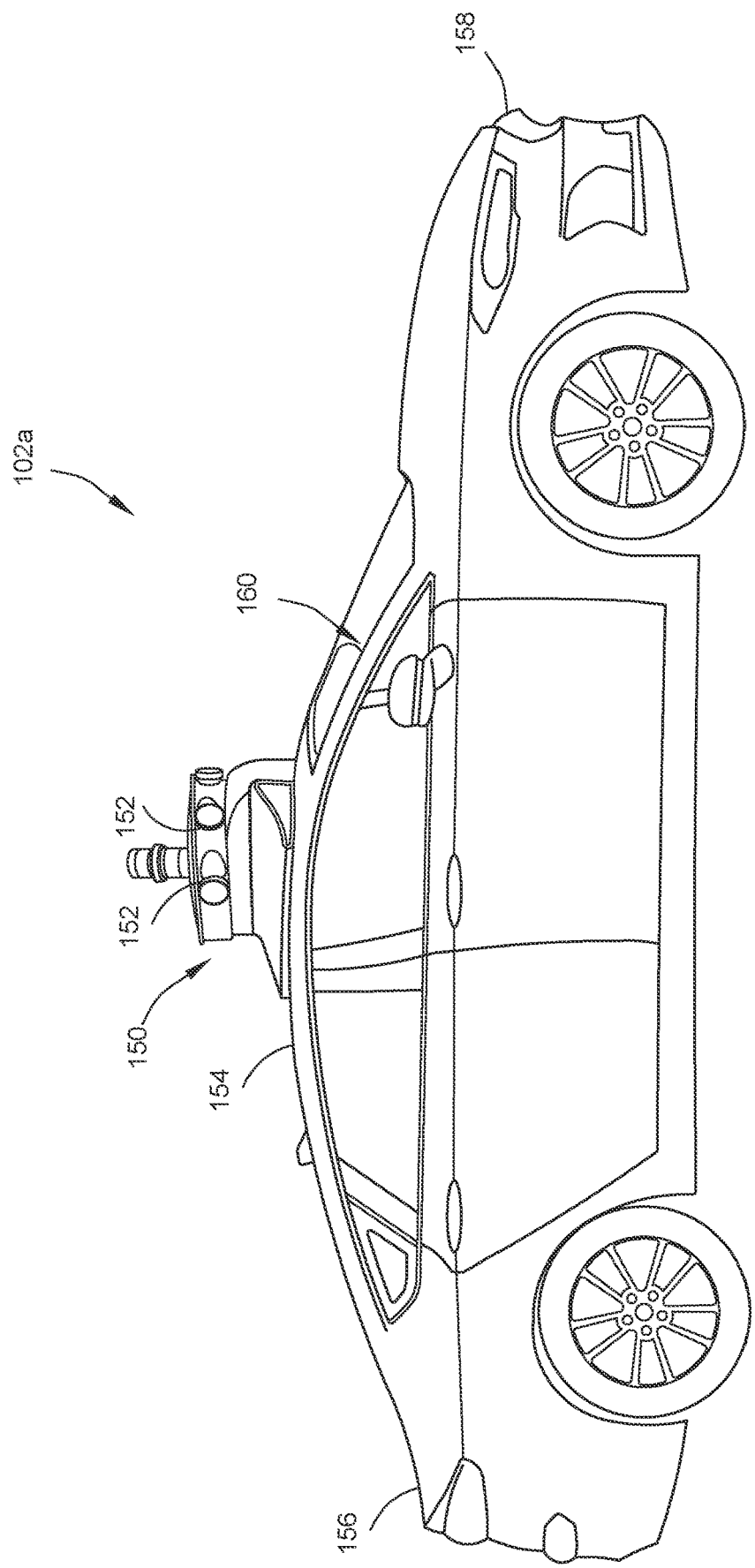
FIG. 1B is a side view of an autonomous or semi-autonomous vehicle including a sensor frame or housing on the roof of the vehicle, according to an aspect of the present disclosure.
Figure 2:
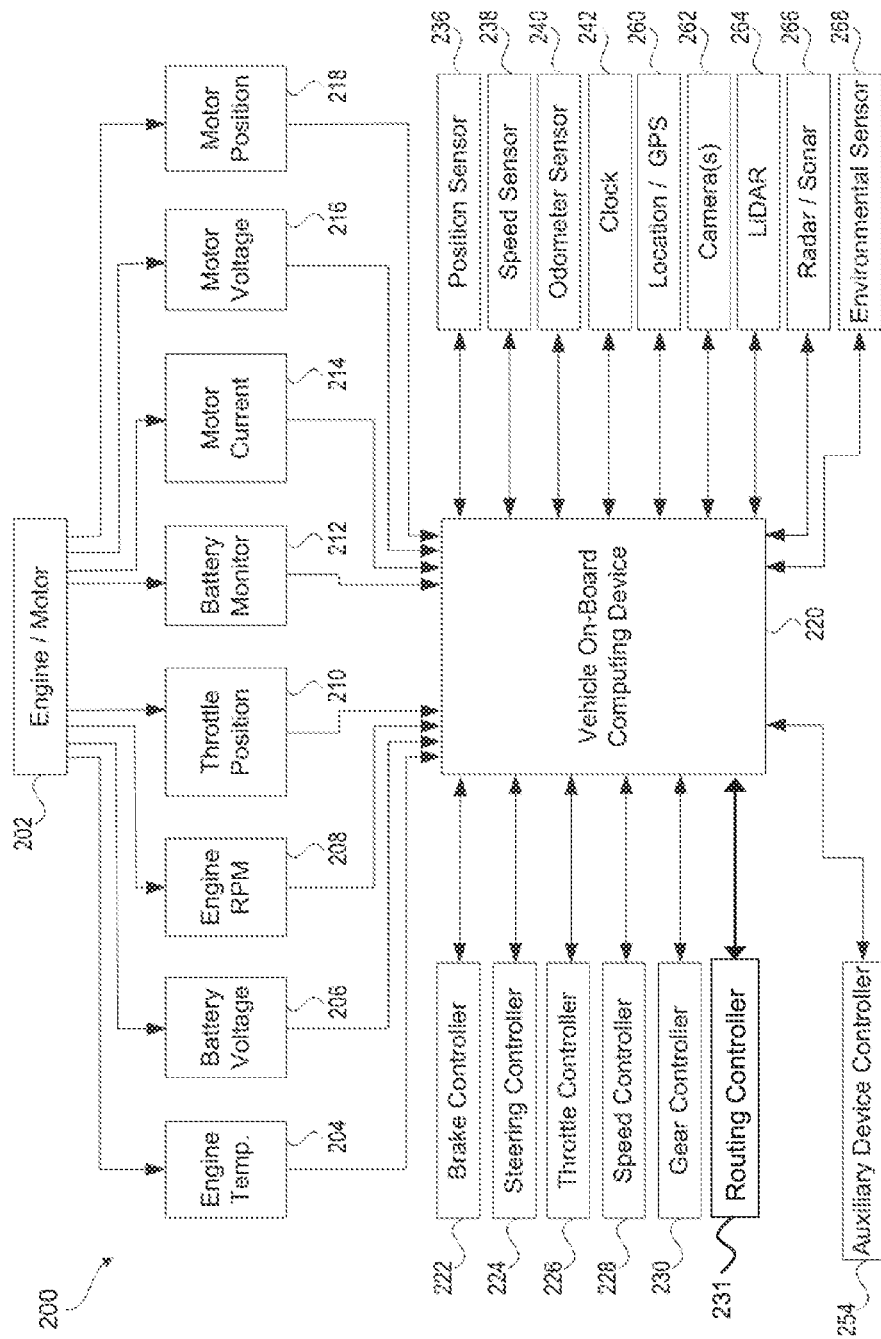
FIG. 2 is a schematic drawing illustrating exemplary system architecture for an autonomous or semi-autonomous vehicle, according to an aspect of the present disclosure.

As used herein, a "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, water-going vessels, boats, airplanes, helicopters, and/or aerial drones. An "autonomous vehicle" is a vehicle having a processor, programming instructions, and drivetrain components that are controllable by the processor without requiring a human operator. An autonomous vehicle may be "fully autonomous" in that it does not require a human operator for most or all driving conditions and functions, or it may be "semi-autonomous" in that a human operator may be required in certain conditions or for certain operations, or that a human operator may override the vehicle's autonomous system and may take control of the vehicle. Exemplary autonomous vehicles that can be used with the devices and systems of the present disclosure are shown in FIGS. 1A and 1B. A system architecture 200 for controlling the vehicle 102a is shown in FIG. 2.

1. Autonomous Vehicle System

FIGS. 1A and 1B illustrate an exemplary vehicle system 100 for the vehicle 102a, which may include the cleaning devices 310, 410 of the present disclosure.

In particular, FIG. 1A illustrates the vehicle system 100 with the vehicle 102a traveling along a road. The vehicle 102a is generally configured to detect objects in proximity to the vehicle 102a. The objects can include, but are not limited to, another vehicle 102b, a cyclist 114 (such as a rider of a bicycle, electric scooter, motorcycle, or the like) and/or a pedestrian 116. As illustrated in FIG. 1A, the vehicle 102a may include a sensor system 111, an on-board computing device 113, a communications interface 117, and a user interface 115. The vehicle 102a may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, and/or braking signals or commands.

The sensor system 111 may include one or more sensors that are coupled to and/or are included within the vehicle 102a, as illustrated in FIG. 2. For example, such sensors may include, without limitation, a LiDAR system, a radio detection and ranging (RADAR) system, a laser detection and ranging (LADAR) system, a sound navigation and ranging (SONAR) system, one or more cameras or vision sensors (e.g., visible spectrum cameras, such as stereo cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, and/or the like. In some examples, the sensor system 111 can be configured to direct a laser beam or light beam 104 towards object(s) in proximity to the vehicle 102a and measure reflected light 106 reflected from the objects back towards the vehicle 102a, as shown in FIG. 1A. The sensor data can include information that describes the location of objects within the surrounding environment of the vehicle 102a, information about the environment itself, information about the motion of the vehicle 102a, information about a route of the autonomous vehicle 102a, or the like. As the vehicle 102a travels over a surface, such as a roadway, at least some of the sensors may collect data pertaining to the surface. It should be noted that the LiDAR systems for collecting data pertaining to the surface may be included in systems other than the vehicle 102a such as, without limitation, other vehicles (autonomous or driven), robots, satellites, etc.

A network 108 for communication with the vehicle 102a can include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network 108 may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The vehicle 102a may retrieve, receive, display, and edit information generated from a local application or delivered via a network 108 from a remote computing device 110 and/or database 112. For example, the database 112 may be configured to store and supply raw data, indexed data, structured data, map data, program instructions, or other data configurations.

The communications interface 117 may be configured to allow communication between the vehicle 102a and external systems, such as, for example, external devices, sensors, other vehicles, servers, data stores, and/or databases. The communications interface 117 may utilize any known or hereafter known protocols, protection schemes, encodings, formats, packaging, etc., such as, without limitation, Wi-Fi, an infrared link, Bluetooth®, etc. The user interface system 115 may be part of peripheral devices implemented within the vehicle 102a including, for example, a keyboard, a touch screen display device, a microphone, and/or a speaker.

FIG. 1B illustrates an exterior of the vehicle 102a including a sensor housing or sensor frame 150, which can be used to support components of the sensor system 111. For example, multiple cameras can be enclosed within or mounted to the sensor housing or sensor frame 150. Some of the cameras may be mounted a fixed distance apart in order to generate stereo images of a scene. The sensor frame 150 can also include other object-detection sensors for detecting objects and/or the environment surrounding the vehicle 102a.

As shown in FIG. 1B, the sensor housing or frame 150 can be positioned at any convenient location on the exterior of the vehicle 102a. For example, as shown in FIG. 1B, the sensor frame 150 is positioned on a roof 154 of the vehicle 102a. In other examples, the sensor frame 150 and/or other structures for supporting the cameras can be positioned at many other locations on either the exterior of the vehicle 102a, such as on a trunk 156 of the vehicle 102a, or proximate to a front portion or grill 158 of the vehicle 102a. In other examples, components of the sensor housing or frame 150 can be positioned inside a cabin 160 of the vehicle 102a.

In some examples, the sensor housing or frame 150 includes multiple openings or apertures 152 for the camera(s) positioned around the sensor housing or frame 150. The camera(s) and apertures 152 can be oriented in different directions to provide a panoramic view (i.e., a view of from 180 degrees to 360 degrees) of objects and/or the environment surrounding the vehicle 102a. The cleaning devices 310, 410 (shown in FIGS. 3A-3H and FIG. 4) of the present disclosure can be configured to be secured to the sensor housing or frame 150 in proximity to cameras and other vehicle sensors for cleaning the covers or lenses of the sensors or cameras during operation of the vehicle 102a. In other examples, the cleaning device 310, 410 (shown in FIGS. 3A-3H and FIG. 4) can be attached to another portion of the exterior of the vehicle 102a for cleaning the sensors or cameras of the vehicle 102a that are not enclosed within the sensor frame 150.

2. Autonomous or Semi-Autonomous Vehicle System Architecture

FIG. 2 illustrates an exemplary system architecture 200 for vehicle 102a, such as an autonomous or semi-autonomous vehicle, in accordance with aspects of the present disclosure. It is understood, however, that other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors, and controllers may be included based on a type of vehicle, as is known.

As shown in FIG. 2, the system architecture 200 comprises an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors, such as a battery monitoring system 212 (to measure current, voltage, and/or temperature of the battery), motor current sensors 214 and voltage sensors 216, and motor position sensors 218, such as resolvers and encoders.

Operational parameter sensors that are common to both types of vehicles include, for example: a position sensor 236, such as an accelerometer, gyroscope, and/or inertial measurement unit; a speed sensor 238; and an odometer sensor 240. The vehicle 102a also may have a clock 242 that the system architecture 200 uses to determine vehicle time during operation. The clock 242 may be encoded into the vehicle on-board computing device 220 (which may be the same as on-board computing device 113 of FIG. 1), it may be a separate device, or multiple clocks 242 may be available.

The vehicle 102a also includes various sensors that operate to gather information about the environment in which the vehicle is traveling. These sensors may include, for example: a location sensor 260 (e.g., a Global Positioning System ("GPS") device); object detection sensors such as one or more vision sensors or cameras 262, such as cameras used for obtaining a stereo image of a scene; a LiDAR system 264; and/or a radar and/or a sonar system 266. The sensors also may include environmental sensors 268, such as a precipitation sensor and/or ambient temperature sensor. The object detection sensors may enable the vehicle to detect objects that are within a given distance range of the vehicle 102a in any direction, while the environmental sensors 268 collect data about environmental conditions within the vehicle's area of travel.

During operations, information is communicated from the sensors to a vehicle on-board computing device 220. The on-board computing device 220 may be implemented using a computer system, such as the computer system 600 illustrated in FIG. 6. The vehicle on-board computing device 220 analyzes the data captured by the sensors and optionally controls operations of the vehicle 102a based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, or mobile devices transported by the vehicle 102a.

Geographic location information may be communicated from the location sensor 260 to the on-board computing device 220, which may then access a map of the environment that corresponds to the location information to determine known fixed features of the environment, such as streets, buildings, stop signs, and/or stop/go signals. Captured images from the camera(s) 262 and/or object detection information captured from sensors, such as LiDAR system 264, is communicated from those sensors to the on-board computing device 220. The object detection information and/or captured images are processed by the on-board computing device 220 to detect objects in proximity to the vehicle 102a. Any known or to be known technique for making an object detection based on sensor data and/or captured images can be used in the embodiments disclosed in this document.

LiDAR information is communicated from LiDAR system 264 to the on-board computing device 220. Additionally, captured images are communicated from the camera(s) 262 to the vehicle on-board computing device 220. The LiDAR information and/or captured images are processed by the vehicle on-board computing device 220 to detect objects in proximity to the vehicle 102a. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for the vehicle 102a. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various examples, the on-board computing device 220 may determine perception information of the surrounding environment of the vehicle 102a. Based on the sensor data provided by one or more sensors and location information that is obtained, the on-board computing device 220 may determine perception information of the surrounding environment of the vehicle 102a. The perception information may represent what an ordinary driver would perceive in the surrounding environment of the vehicle 102a. The perception data may include information relating to one or more objects in the environment of the vehicle 102a. For example, the on-board computing device 220 may process sensor data (e.g., LiDAR or RADAR data, camera images, etc.) in order to identify objects and/or features in the environment of the vehicle 102a. The objects may include traffic signals, road way boundaries, other vehicles, pedestrians, and/or obstacles, etc. The on-board computing device 220 may use any known or hereafter known object recognition algorithms, video tracking algorithms, and computer vision algorithms (e.g., track objects frame-to-frame iteratively over a number of time periods) to determine the perception.

In some examples, the on-board computing device 220 may also determine, for one or more identified objects in the environment, the current state of the object. The state information may include, without limitation, for each object: current location; current speed and/or acceleration; current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. The on-board computing device 220 may also predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the vehicle 102*a*, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to entering the intersection.

In various embodiments, the on-board computing device 220 may determine a motion plan for the vehicle 102*a*. For example, the on-board computing device 220 may determine a motion plan for the vehicle 102*a* based on the perception data and/or the prediction data. Specifically, given predictions about the future locations of proximate objects and other perception data, the on-board computing device 220 can determine a motion plan for the vehicle 102*a* that best navigates the vehicle 102*a* relative to the objects at their future locations.

In some examples, the on-board computing device 220 may receive predictions and make a decision regarding how to handle objects and/or actors in the environment of the vehicle 102*a*. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the vehicle 102*a* to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the vehicle 102*a*. If the risk exceeds an acceptable threshold, it may determine whether the collision can be avoided if the vehicle 102*a* follows a defined vehicle trajectory and/or implements one or more dynamically generated emergency maneuvers performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the vehicle 102*a* is generated for execution. The on-board computing device 220 may, for example, control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

3. Vehicle Sensor Cleaning Device

FIGS. 3A-3H illustrate an exemplary vehicle sensor or camera assembly 302 and cleaning device 310 configured to be secured to the exterior of the vehicle 102*a*. The vehicle sensor or camera assembly 302 can be configured to support a vehicle optical sensor or camera, which may comprise any of the camera(s) discussed above in connection with the sensor system 111 or system architecture 200. The cleaning device 310 of the present disclosure is configured to direct dust, dirt, or debris away from a cover or lens 320 of the vehicle sensor or camera reducing the possibility that the dust, dirt, or debris will become adhered to a lens or cover 320 of the sensor or camera. When dust, dirt, or debris is present on the cover or lens 320, the cleaning device 310 is configured to clean or wash the cover or lens 320 to remove the dust, dirt, or debris.

Figure 3B:
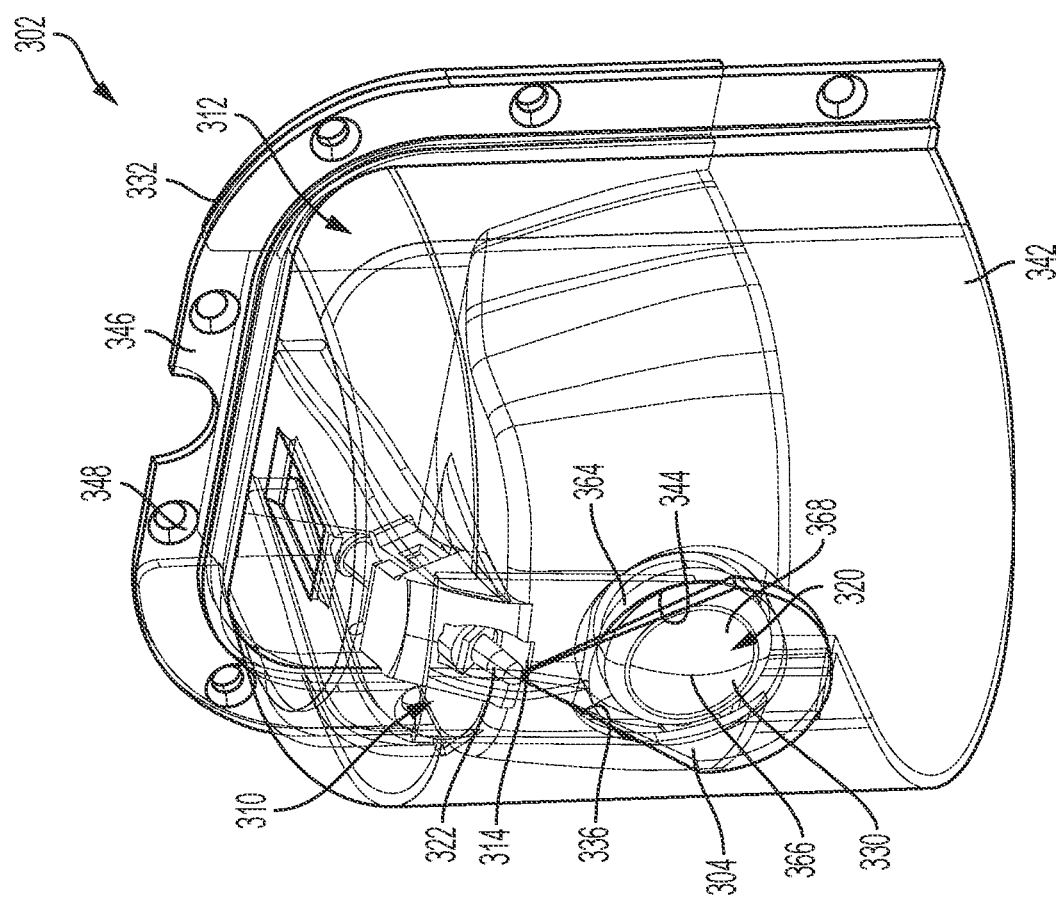
FIG. 3B is another perspective view of the vehicle sensor assembly and cleaning device of FIG. 3A showing air and liquid streams projected from the cleaning device towards a lens or cover of the vehicle sensor, according to an aspect of the present disclosure.
Figure 3A:
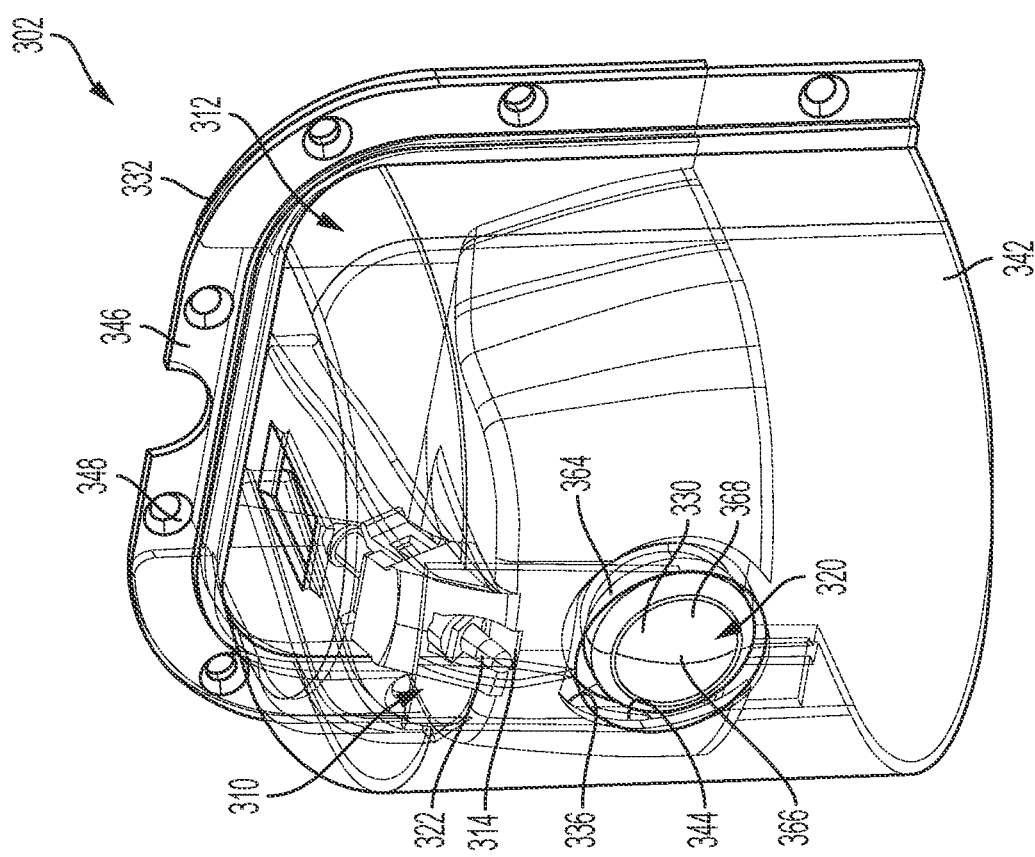
FIG. 3A is a perspective view of a vehicle sensor assembly and cleaning device, according to an aspect of the present disclosure.
Figures 3E, 3F:
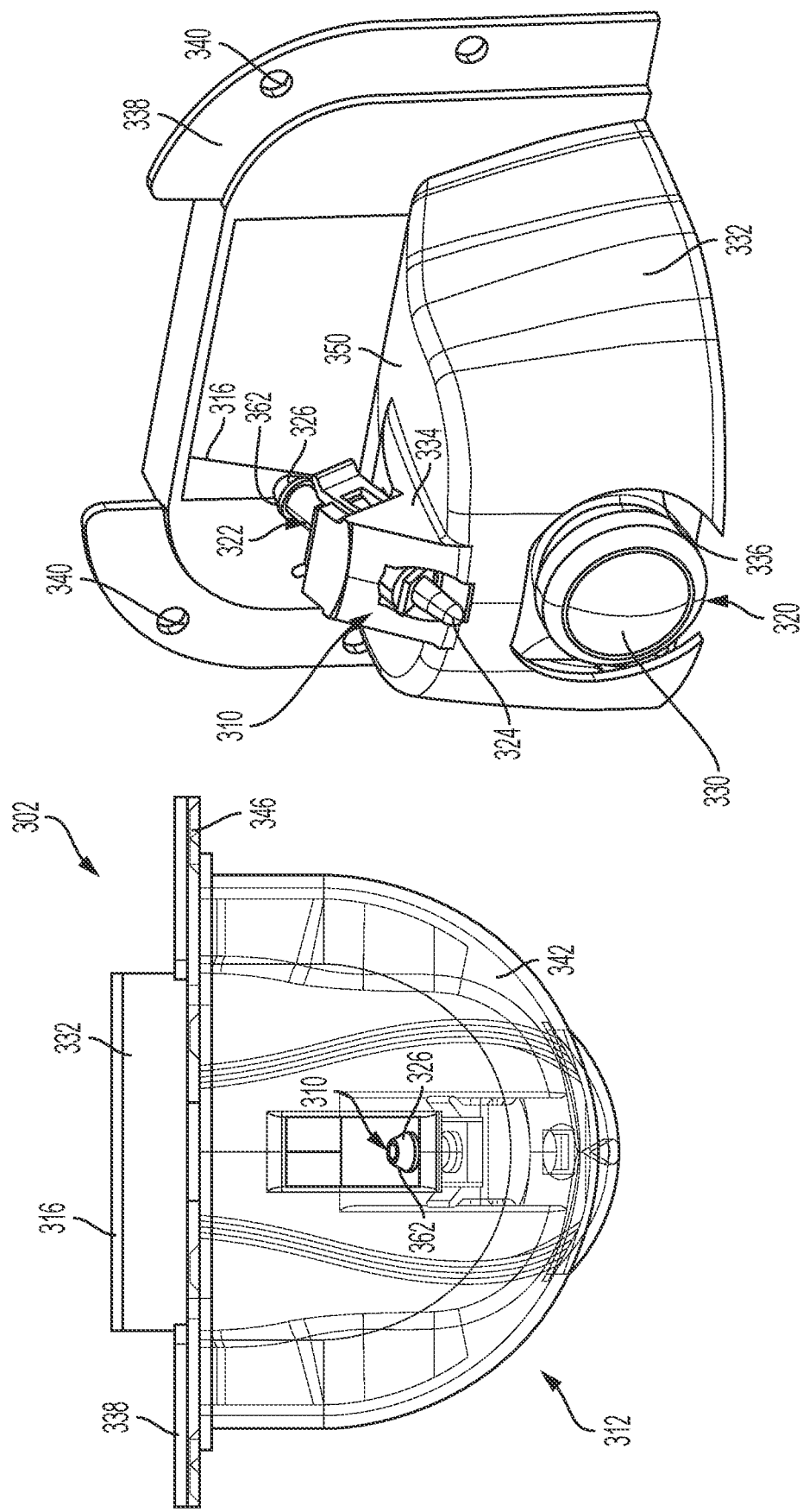
FIG. 3E is a top view of the vehicle sensor assembly and cleaning device of FIG. 3A.
FIG. 3F is a perspective view of an interior or first housing part of the vehicle sensor assembly and cleaning device of FIG. 3A.
Figure 3G:
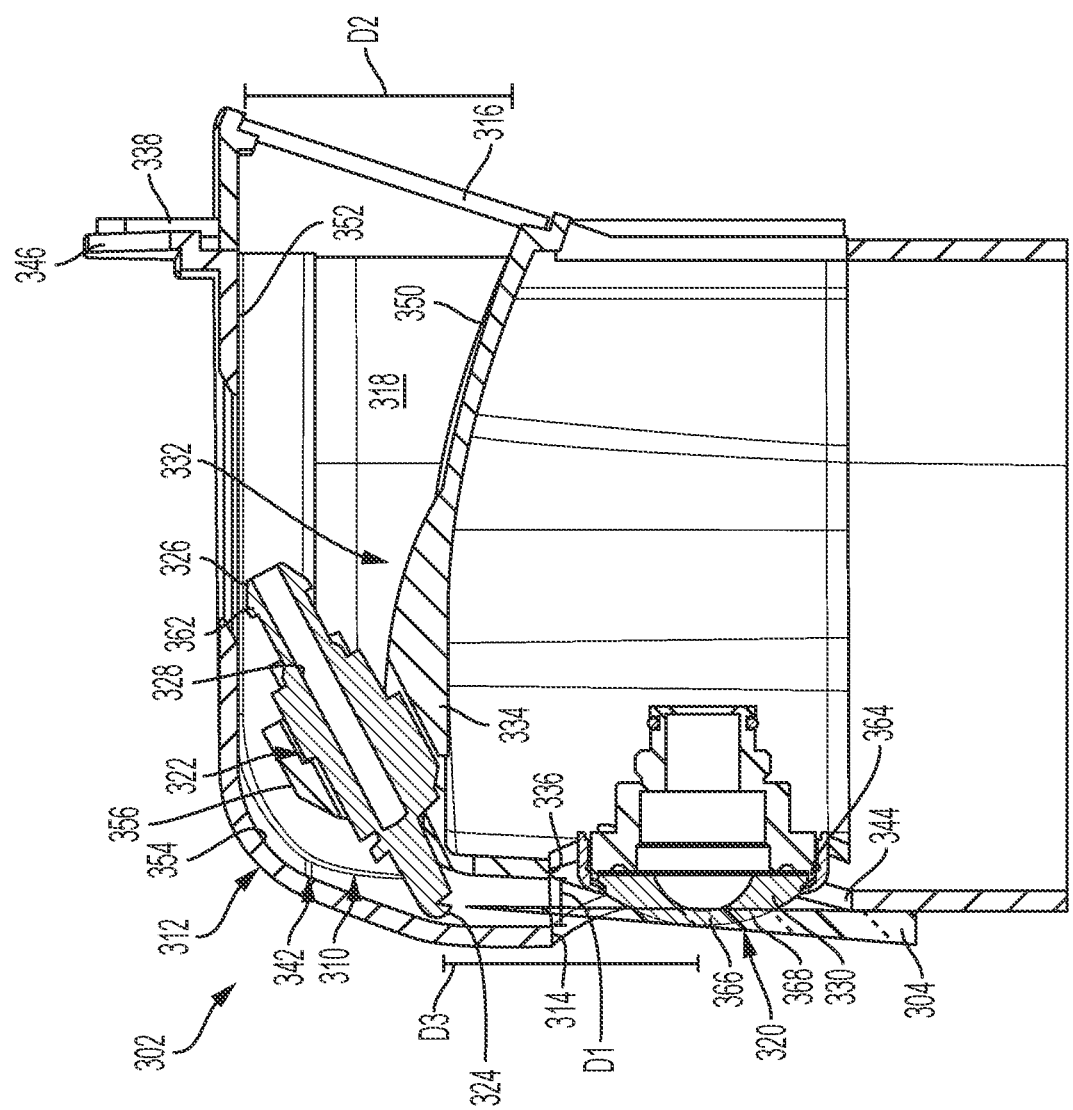
FIG. 3G is a cross-sectional view of the vehicle sensor assembly and cleaning device of FIG. 3A, showing the air and liquid streams projected from the cleaning device towards a lens or cover of the vehicle sensor.
Figure 3H:
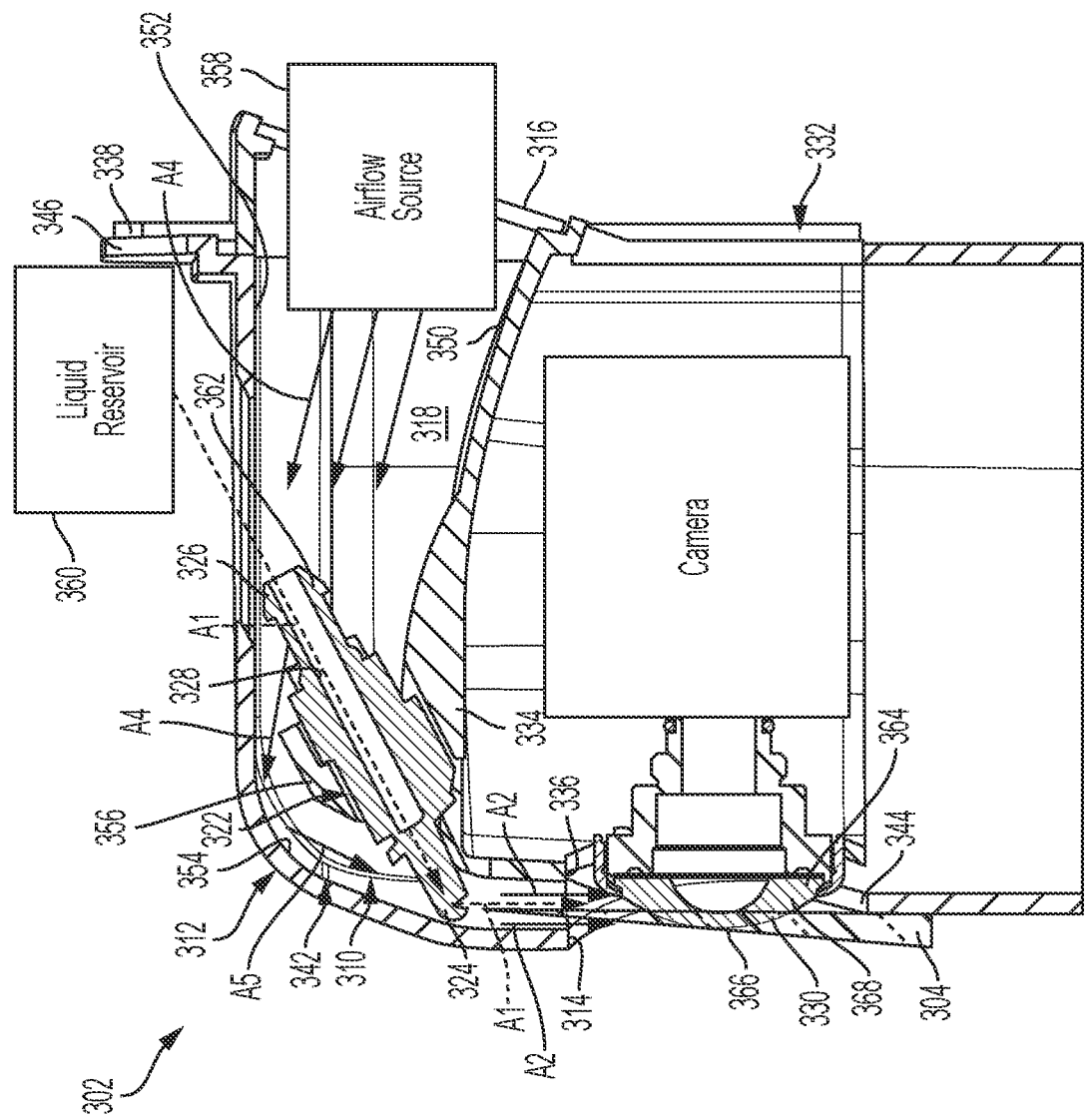
FIG. 3H is a schematic drawing of a cross-sectional view of the vehicle sensor assembly and cleaning device of FIG. 3A showing a liquid reservoir and airflow source, according to an aspect of the present disclosure.

More specifically, FIG. 3A is a perspective view of a front portion of the cleaning device 310. FIG. 3B is another perspective view of the front portion of the cleaning device 310 showing a liquid stream 304 (shown in FIGS. 3B, 3G, and 3H) that extends over an outer surface of the cover or lens 320 of the vehicle sensor or camera. FIG. 3C is a front view of the cleaning device 310. FIG. 3D is a side view of the cleaning device 310. FIG. 3E is a top view of the cleaning device 310. FIG. 3F is a perspective view of an interior or first housing part 332 of the cleaning device 310. FIG. 3G is a cross-sectional view of the cleaning device 310 showing the liquid stream 304 passing over the cover or lens 320 of the sensor or camera. FIG. 3H is a schematic drawing showing a cross-sectional view of the cleaning device 310 and an airflow source, camera, and liquid reservoir connected to and/or enclosed within the cleaning device 310.

The cleaning device 310 for the vehicle sensor or camera comprises a housing 312 comprising an open first end 314, an open second end 316, and a passageway 318 extending between the open first end 314 and the open second end 316. The housing 312 can be made from any suitable rigid material configured to protect components of the sensor, camera, or cleaning system, such as rigid plastic or metal. The housing 312 also provides a support structure that supports the cover or lens 320 of the sensor or camera and fluid delivering components of the cleaning device 310 in proximity to the cover or lens 320. For example, as shown most clearly in the front view of FIG. 3C, the open first end 314 of the housing 312 can be positioned at about twelve o'clock or 0 degree relative to the cover or lens 320.

As shown in FIGS. 3G and 3H, the open first end 314 of the housing 312 can be narrower than the open second end 316 of the housing 312 to concentrate and direct airflow passing through the open first end 314 towards the cover or lens 320. For example, the open first end 314 of the housing 312 can have a diameter D1 (shown in FIG. 3G) or width of from about 1.0 cm to about 2.0 cm. The second open end 316 of the housing 312 can be wider having a diameter D2 (shown in FIG. 3G) or width of about 2.0 cm to about 15 cm.

The cleaning device 310 further comprises one or multiple nozzles 322 at least partially positioned within the passageway 318 of the housing 312. For example, the cleaning device 310 can comprise a single nozzle 322, as shown in FIGS. 3A-3H, for directing fluid towards the cover or lens 320. In other examples, the cleaning device 310 can comprise two, three, four, or more nozzles 322 for directing multiple fluid streams towards the cover or lens 320. In some examples, portions of the nozzle 322 can be positioned in the housing 312 proximate to the open first end 314 of the housing 312 for providing the liquid stream 304 through the open first end 314 of the housing 312. Other portions of the nozzle 322 can extend through and/or be positioned outside of the passageway 318 and, for example, may be connected to a liquid reservoir 360 (shown in FIG. 3H) that holds liquid that can be expelled from the nozzle 322 as the liquid stream 304.

In some examples, the nozzle 322 can be a commercially available nozzle or jet configured to provide a stream of liquid aimed towards the cover or lens 320 of the vehicle sensor or camera. Exemplary cleaning nozzles 322 that can be used with the cleaning devices 310 disclosed herein include nozzles made by ARaymond Automotive (Grenoble, France). The liquid stream 304 provided by the nozzle 322 can have a variety of different spray patterns based on a size, shape, and position of the cover or lens 320. For example, the nozzle 322 can provide a concentrated spray pattern, such as a spray pattern having a circular cross-section. In other examples, the nozzle 322 can be configured to provide a more dispersed spray pattern, such as a triangular, conical, pyramidal, or pie-shaped (as shown in FIG. 3B) spray pattern or spray shape. In some examples, the spray can be provided from the nozzle 322 as a continuous single jet, multi-jet, or oscillating liquid stream.

The nozzle 322 comprises an outlet 324 that provides the liquid stream 304 through the open first end 314 of the housing 312 towards the cover or lens 320 of the vehicle sensor or camera. The outlet 324 can be sized and configured to provide the desired spray pattern. For example, the outlet 324 can have a diameter of from about 0.1 cm to 1.0 cm in diameter. Further, in some examples, the outlet 324 can be adjustable and configured to provide different spray patterns depending, for example, on a type of dirt, dust, or other debris on an outer surface 330 of the cover or lens 320. In order to ensure that the liquid stream expelled from the nozzle 322 contacts the cover or lens 320 with sufficient force to dislodge dust, dirt, or other debris adhered to a surface of the cover or lens 320, the outlet 324 of the nozzle 322 can be spaced apart from the cover or lens 320 by a distance D3 (shown in FIG. 3G). Specifically, the distance D3 is the vertical distance from the outlet 324 to a center of the cover or lens 320. A minimum value for the distance D3 for a triangular spray pattern can be calculated from the following equation, where r is a radius of the cover or lens 320 and θ is a spray angle of the nozzle 322:

$$D3 = r\sin(\theta/2) - 1$$

The nozzle 322 can also comprise an inlet 326 at an opposite end of the nozzle 322 from the outlet 324 and a liquid channel 328 extending through the nozzle 322 between the inlet 326 and the outlet 324. The liquid channel 328 can become progressively narrower moving towards the outlet 324 of the nozzle 322, such that liquid flowing through the liquid channel 328 accelerates and is expelled through the outlet 324 as a pressurized liquid stream 304. The outlet 324 of the nozzle 322 can be positioned in the passageway 318 of the housing 312, such that air passing through the passageway 318 of the housing 312 and the liquid stream 304 expelled from the outlet 324 of the nozzle 322 both pass through a portion of the passageway 318 and are expelled from the housing 312 through the open first end 314 of the housing 312.

As previously described, the cleaning device 310 of the present disclosure can be configured to provide a combined or collimated fluid stream formed from the liquid stream 304 from the nozzle 322 and air streams passing through the passageway 318 of the housing 312. As used herein, a "collimated fluid stream" means a combined stream of liquid and air, in which the liquid and air are directed in substantially the same direction towards a common target location. In particular, the liquid stream 304 can project from the open first end 314 of the housing 312 in a direction (shown by arrow A1 in FIG. 3H) parallel to or substantially parallel (e.g., within about 5 degrees of parallel) to a direction of the air streams (shown by arrows A2 in FIG. 3H) passing through the open first end 314 of the housing 312. Further, in some examples, the air streams passing through the open first end 314 of the housing 312 can partially or fully surround the liquid stream 304 in order to direct the liquid stream 304 toward the target location and/or to ensure that the liquid stream 304 remains as a concentrated liquid flow that does not substantially disperse prior to contacting the target location. For example, the liquid stream 304 can pass through a central portion of the open first end 314 of the housing 312 and the air streams can pass through peripheral portions of the open first end 314 of the housing 312.

In some examples, the arrangement of the liquid stream 304 and the air streams is selected in order to wash or clean both areas of the cover or lens 320 that are directly contacted by the liquid stream 304, and also "blind areas" of the cover or lens 320 that are not directly contacted by the liquid stream 304. As used herein, the "blind areas" can refer to portions of an outer surface 330 of the cover or lens 320 that are not directly contacted by the liquid stream 304 expelled from the nozzle 322, such as, for example, portions of the cover or lens 320 that are on an opposite side and/or face away from the nozzle 322. For example, the air streams can cause liquid from the liquid stream 304 to remain on the outer surface 330 of the cover or lens 320 rather than falling off the outer surface 330 of the cover or lens 320 due to gravity. Instead, the liquid is pressed against the surface 330 of the cover or lens 320 by the air streams and flows over many or all areas of the surface 330 of the cover or lens 320, including both the areas that are directly contacted by the liquid stream 304 and the blind areas.

In some examples, the housing 312 of the cleaning device 310 is a multipart housing 312 formed from different parts that are connected together to enclose components of the camera or vehicle sensor and components of the cleaning device 310. For example, the housing 312 can comprise the interior or first housing part 332, which is shown most clearly in FIG. 3F. As shown in FIG. 3F, the first housing part 332 comprises a mounting portion or bracket 334 for receiving the nozzle 322. The first housing part 332 can also be sized to enclose portions of the camera or vehicle sensor as shown in FIG. 3H. Further, the first housing part 332 can comprise a camera aperture or opening 336 sized so that the cover or lens 320 of the vehicle sensor or camera can protrude through the camera aperture or opening 336. The aperture or opening 336 can have a variety of shapes depending, for example, on the size and shape of the cover or lens 320. For example, the camera aperture or opening 336 can be a circle, oval, square, rectangle, or other shape. The first housing 332 can further comprise a mounting bracket, support, or connector portion 338 for mounting the first housing part 332 to, for example, an exterior of a vehicle. For example, as previously described, the cleaning device housing 312 can be mounted to an exterior of a vehicle, such as the vehicle 102a (shown in FIGS. 1A and 1B). As shown in FIG. 3F, the connector portion 338 can be a u-shaped structure comprising multiple through holes 340 for attaching the first housing part 332 to the vehicle using, for example, fasteners, such as bolts or screws.

The multipart housing 312 further comprises an exterior or second housing part 342 (shown in FIGS. 3A-3E, 3G, and 3H) that at least partially encloses or surrounds the first housing part 332. The exterior or second housing part 342 can be sized to fit over and/or around the first housing part 332 and the nozzle 322. In some examples, the exterior or second housing part 342 comprises a second camera aperture or opening 344 configured to fit over and/or to align with the camera aperture or opening 336 of the first housing part 332, with the cover or lens 320 of the camera or vehicle sensor protruding through both camera apertures or openings 336, 344. The second housing part 342 further comprises a second connector portion 346, which is similar to the connector portion 338 of the first housing part 332. In particular, the second connector portion 346 can include a u-shaped structure comprising multiple through holes 348 positioned to align with the through holes 340 of the first housing part 332. Fasteners, such as bolts or screws, can be inserted through the holes 340, 348 of the housing parts 332, 342 to secure the housing 312 to the vehicle and to secure the housing parts 332, 342 together.

As shown most clearly in FIGS. 3G and 3H, the first housing part 332 and the second housing part 342 enclose and define the passageway 318, the open first end 314, and the open second end 316 of the housing 312. For example, an outer surface 350 of the interior or first housing part 332 can form a bottom of the passageway 318. An inner surface 352 of the exterior or second housing part 342 can form sides and a top of the passageway 318. In some examples, as shown in FIGS. 3G and 3H, the housing parts 332, 342 can also be positioned to form or define a bend or curve in the passageway 318 proximate to the nozzle 322. For example, the inner surface 352 of the exterior or second housing part 342 can include a concavely curved portion 354. Similarly, the outer surface 350 of the interior or first housing part 332 can comprise a convexly curved portion 356. As shown in FIG. 3H, the concavely curved portion 354 of the exterior or second housing part 342 and the convexly curved portion 356 of the interior or first housing 332 create curved air streams. In particular, the airflow or air streams pass into the passageway 318 through the second open end 316 of the housing 312 in a first direction (shown by arrow A4 in FIG. 3H) and then contact the curved portions 354, 356 of the surfaces 350, 352 of the housing parts 332, 342 and are then directed through the open first end 314 of the housing 312 toward the cover or lens 320 of the camera or vehicle sensor in a second direction (shown by arrow A5 in FIG. 3H).

In some examples, the open second end 316 of the housing 312 is configured to be connected to an airflow source 358 (shown in FIG. 3H) that moves air through the passageway 318 of the housing 312. As previously described, airflow or air streams moving through the passageway 318 of the housing 312 are directed through the open first end 314 of the housing 312 towards the cover or lens 320 of the camera or vehicle sensor. The airflow source 358 can be any device or reservoir that provides pressurized air moving through the passageway 318 with sufficient force and/or flow rate to remove dust, dirt, and other debris from the cover or lens 320 and with sufficient force to direct the liquid stream 304 in a desired direction. For example, the airflow source 358 can be a source of compressed air, an air pump (e.g., a rotary pump, positive displacement pump, blower, etc.), or a fan.

In some examples, the outlet 324 of the nozzle 322 can be configured to be fluidly connected to a liquid source, such as a liquid reservoir 360 containing, for example, a glass cleaning solution, windshield wiper fluid, and/or a similar cleaning solution. As used herein, a "liquid reservoir" can refer to a container, enclosure, cartridge, barrel, or similar structure that contains a sufficient amount of liquid for cleaning dirt, dust, and other debris from the surface of the cover or lens 320. In some examples, the inlet 326 of the nozzle 322 can be directly connected to an outlet or fluid port of the liquid reservoir 360. In other examples, flexible plastic tubing, pipes, or other fluid conduits can extend between the outlet or fluid port of the liquid reservoir 360 and the inlet 326 of the nozzle 322. As shown in FIGS. 3G and 3H, in some examples, the inlet 326 of the nozzle 322 can comprise a connector 362, such as a barb, protrusion, and/or raised ring, for securing and sealing the conduit to the nozzle 322 in a fluid-tight manner.

In some examples, fluid flow from the liquid reservoir 360 to the nozzle 322 can be substantially passive occurring due to gravity. For example, a valve (shown in FIG. 4) can be positioned proximate to the outlet or fluid port of the liquid reservoir 360 and/or at another convenient location in a conduit between the liquid reservoir 360 and the nozzle 322. When the valve is in an open position, fluid flow from the liquid reservoir 360 to the nozzle 322 is permitted. When the valve is closed, fluid flow from the liquid reservoir 360 to the nozzle 322 is prevented. In other examples, liquid can be actively expelled from the liquid reservoir 360 to the nozzle 322 as a pressurized fluid stream. For example, the liquid reservoir 360 can comprise a plunger, piston, pump, or similar liquid moving device that actively expels the liquid from the liquid reservoir 360 to the nozzle 322.

The cover or lens 320 of the vehicle sensor or camera can have a variety of shapes and configurations depending, for example, on a type of sensor or camera enclosed within the housing 312 and/or on a type image data collected by the sensor or camera. In general, as shown in FIGS. 3A-3D and 3F-3H, the cover or lens 320 is a circular structure having a circular peripheral edge 364 and a convex outer surface 330 extending radially inward from the peripheral edge 364 to a center 366 of the convex outer surface 330.

As shown most clearly in FIGS. 3G and 3H, the nozzle 322 is configured to project the liquid stream 304 toward the convex outer surface 330 of the cover or lens 320. For example, the liquid stream 304 expelled from the nozzle 322 can be directed towards a side portion 368 of the convex outer surface 330 of the cover or lens 320 between the peripheral edge 364 of the outer surface 330 and the center 366 of the outer surface 330. As previously described, the convex outer surface 330 includes blind areas that are farther away from the nozzle 322 than other areas of the convex outer surface 330 and which are not directly contacted by the liquid stream 304. The air streams are provided to ensure that the liquid from the liquid stream 304 remains in contact with the convex outer surface 330 of the cover or lens 320 directing the liquid over the convex outer surface 330, including over the blind areas, and ensuring that the blind areas are washed in an appropriate manner to remove dirt, dust, and other debris from the blind areas.

4. Vehicle Sensor System

Figure 4:
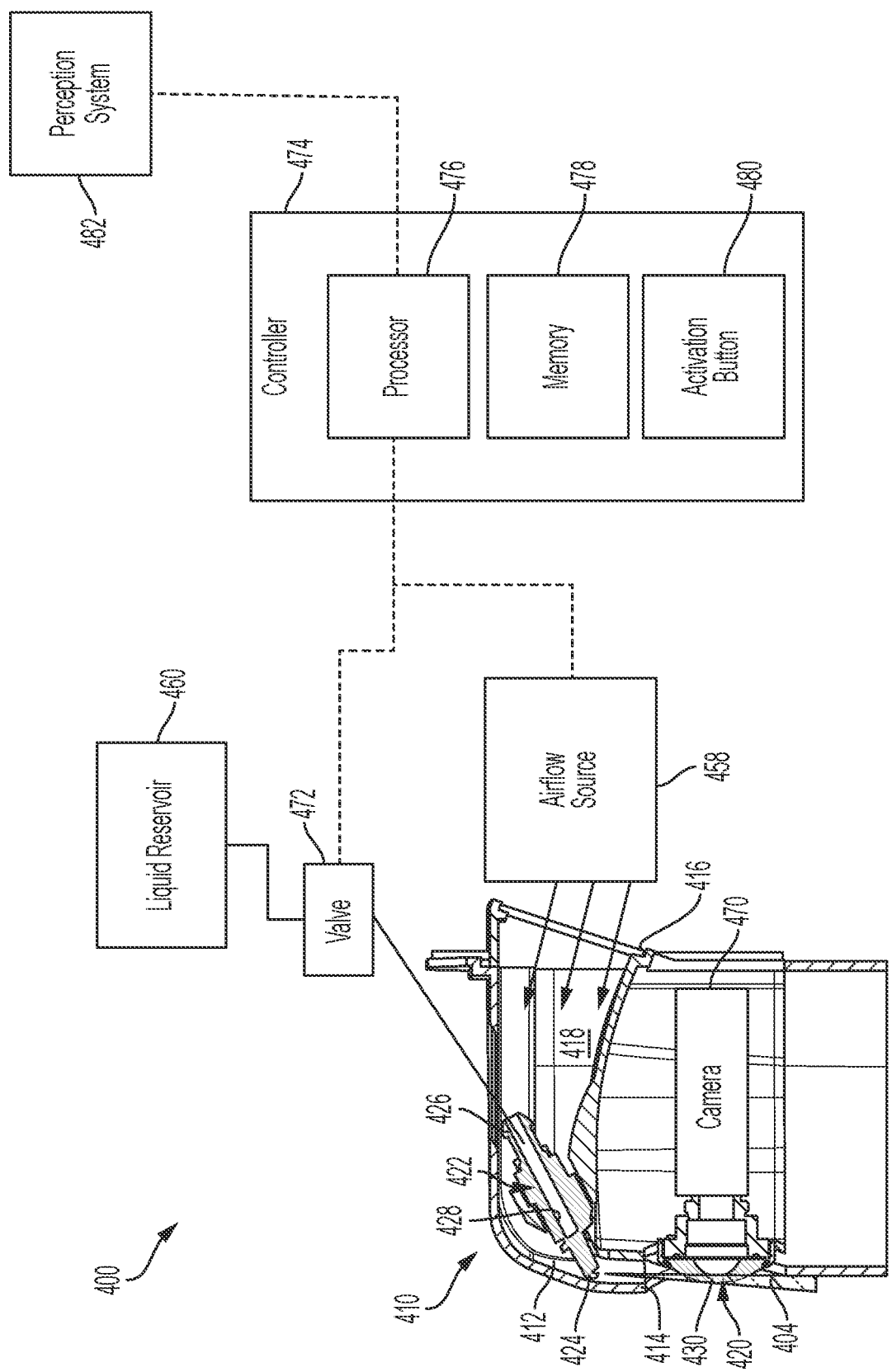
FIG. 4 is a schematic drawing of a vehicle sensor system including a cleaning device for a vehicle sensor, according to an aspect of the present disclosure.

FIG. 4 shows a vehicle sensor system 400 including a vehicle sensor, such as a camera 470, and a cleaning device 410 for cleaning a cover or lens 420 of the camera 470. As in previous examples, the cleaning device 410 for the vehicle sensor or camera 470 comprises a housing 412 enclosing a passageway 418 extending between an open first end 414 and an open second end 416 of the housing 412. The cleaning device 410 further comprises a nozzle 422 at least partially positioned within the passageway 418 of the housing 412. The nozzle 422 comprises an inlet 426, an outlet 424 that expels a liquid stream 404 through the open first end 414 of the housing 412 towards the cover or lens 420 of the vehicle sensor or camera 470, and a liquid channel 428 extending between the inlet 426 and the outlet 424. The housing 412 can be positioned such that air streams passing through the passageway 418 pass through the open first end 414 of the housing 412 towards the lens or cover 420 of the vehicle sensor or camera 470 along with the liquid stream expelled from the nozzle 422.

As in previous examples, components of the vehicle sensor or camera 470 can be positioned within an interior of a housing 412 of the cleaning device 410. For example, components of the camera 470 can be enclosed within the interior or first housing part 332 (shown in FIG. 3F). The sensor cover or lens 420 can extend through a camera aperture or opening in the housing 412 positioned such that a field-of-view of the sensor or camera 470 is directed through the cover or lens 420.

The system 400 further comprises a liquid reservoir 460 fluidly connected to the inlet 426 of the nozzle 422 containing liquid to be ejected from the nozzle 422 forming the liquid stream 404. As previously described, the liquid reservoir 460 can be a container, enclosure, cartridge, barrel, or similar structure that contains a sufficient amount of liquid for cleaning and washing dirt, dust, and other debris from the surface of the cover or lens 420. In some examples, the system 400 further comprises a valve 472 between the liquid reservoir 460 and the inlet 426 of the nozzle 422. The valve 472 can be an electromechanical valve, such as a solenoid valve, as are known in the art, configured to open and close in response to control signals received from an electronic device, computer processor, or similar controller. The valve 472 can be configured to periodically permit fluid to flow from the liquid reservoir 460 to the nozzle 422 to be expelled from the nozzle 422 as the liquid stream 404. For example, the valve 472 can be initially provided in a closed position, where liquid flow from the liquid reservoir 460 to the nozzle 422 is prevented. Upon receipt of an electronic control signal, the valve 472 can temporarily move to an open position, where liquid flow from the liquid reservoir 460 to the nozzle 422 through the valve 472 is permitted.

The system 400 further comprises an airflow source 458 connected to the second open end 416 of the housing 412 for moving air through the passageway 418 of the housing 412. In some examples, the airflow source 458 can be a source of compressed or pressurized air. In that case, when a port or valve of the airflow source 458 is in an open position, the pressurized or compressed air can move through the passageway 418 of the housing 412 and can pass through the open first end 414 of the housing 412 as pressurized air streams or an air curtain. In other examples, the airflow source 458 can be an electromechanical device for generating airflow, such as a pump (e.g., a rotary pump, positive displacement pump, or similar device) or fan that, when activated, generates continuous, periodic, or temporary airflow through the passageway 418 of the housing 412. As with the valve 472 of the liquid reservoir 460, the airflow source 458 can be activated or controlled by a control signal received from a computer device or processor to control when air streams are provided to the cover or lens 420 of the vehicle sensor so camera 470.

In some examples, the system 400 further comprises a controller 474 comprising a processor 476, such as a computer processor of the on-board computing device 220 (shown in FIG. 2), and computer memory 478 comprising instructions for controlling operation of electrical components of the cleaning device 410. For example, the controller 474 can be in electrical communication with the airflow source 458, such as the electromechanical pump, and/or with the valve 472 that controls liquid flow from the liquid reservoir 460 to the nozzle 422. The controller 474 can be configured to selectively activate the airflow source 458 to move air through the passageway 418. In a similar manner, the controller 474 can be configured to cause the valve 472 to temporarily open to cause the liquid to flow from the liquid reservoir 460 to the nozzle 422.

As previously described, generally it is expected that airflow will be provided from the cleaning device 410 to the cover or lens 420 of the vehicle sensor or camera 470 continuously or substantially continuously in order to deflect or direct dirt, dust, and other debris away from the cover or lens 420 when the vehicle is in use. The continuous or substantially continuous airflow may prevent most dirt, dust, or other debris from adhering to the outer surface 430 of the cover or lens 420. If dust, dirt, or other debris does become adhered to the outer surface 430 of the cover or lens 420, the controller 474 can be configured to cause liquid to be periodically expelled from the outlet 424 of the nozzle 422 towards the cover or lens 420 as a liquid burst or liquid stream 404. In some examples, the controller 474 can be configured to provide periodic or occasional bursts of liquid in response to a user input. For example, the controller 474 can be configured to receive an input from a user when debris is present on the cover or lens 420 of the vehicle sensor or camera 470, and cause the liquid to pass from the liquid reservoir 460 to the nozzle 422 in response to the received input. In some examples, the system 400 can comprise an activation button 480, user interface, or similar user input accessory that allows the user to identify when a burst of liquid should be provided. For example, when the cover or lens 420 is obscured by dirt, dust, or debris, the user can press the activation button 480.

In response to the button press, the controller 474 can be configured to cause the liquid to pass from the liquid reservoir 460 through the nozzle 422. In some examples, the controller 474 is configured to provide the liquid stream 404 to the cover or lens 420 for a predetermined period of time or as a predetermined number of liquid bursts in response to a single button press or activation signal. For example, in response to the received input or activation signal, the controller 474 can be configured to cause a continuous liquid stream 404 to be provided from the cleaning device 410 to the cover or lens 420 for a period of 5 seconds, 10 seconds, 30 seconds, or any other desired duration. In other examples, the controller 474 can cause a predetermined number of short bursts of liquid to be provided from the cleaning device 410 in response to the button press or activation signal. For example, in response to the received button press or activation signal, the controller 474 can cause one burst, two bursts, five bursts, ten bursts, or any other convenient number of liquid bursts to be provided from the cleaning device 410 to the cover or lens 420. Each burst can last for a predetermined duration, such as 0.25 second, 0.5 second, 1.0 second, 2.0 seconds, or any other convenient duration.

In other examples, the controller 474 can be configured to automatically cause bursts of liquid to be expelled from the cleaning device nozzle 422 based, for example, on information, instructions, and/or control signals received from other systems of the vehicle. For example, the controller 474 can be configured to receive an activation signal from, for example, a perception system 482 of the vehicle. The perception system 482 of the vehicle can comprise electrical components and software of the previously described vehicle on-board computing device 220, shown in FIG. 2. For example, the perception system 482 can comprise a computer device or processor configured to receive data from the camera 470 and/or other vehicle sensors and determine perception information of an environment surrounding the vehicle based on the received data. As previously described, the perception information can represent what an ordinary driver perceives in the surrounding environment of the vehicle. In some examples, the data received from the camera 470 and/or other vehicle sensors can include information relating to objects in the environment of the vehicle. In particular, the computer device or processor of the perception system 482 can use object recognition algorithms, video tracking algorithms, and/or computer vision algorithms (e.g., track objects frame-to-frame iteratively over a number of time periods) to detect the objects in the environment and determine the perception information. The objects may include, for example, traffic signals, road way boundaries, other vehicles, pedestrians, and/or obstacles in proximity to the vehicle.

In some examples, the received activation signal can be an indication from the vehicle sensor or camera 470 that dust, dirt, or debris is present on the cover or lens 420 of the vehicle sensor or camera 470 and is obstructing a field of view of the vehicle sensor or camera 470. In response to the received signal, the controller 474 can be configured to cause the liquid to pass from the liquid reservoir 460 to the nozzle 422 and to be expelled from the nozzle 422 toward the cover or lens 420 of the vehicle sensor or camera 470 as the liquid stream 404.

As in previously described examples, the controller 474 can be configured to provide the liquid stream 404 to the cover or lens 420 for a predetermined period of time or as a predetermined number of liquid bursts in response to the received activation signal. For example, in response to the received activation signal, the controller 474 can be configured to cause the continuous liquid stream 404 to be provided from the cleaning device 410 to the cover or lens 420 for a period of 5 seconds, 10 seconds, 30 seconds, or any other desired duration. In other examples, the controller 474 can cause a predetermined number of short bursts of liquid to be provided from the cleaning device 410 in response to the activation signal. For example, in response to the received activation signal, the controller 474 can cause one burst, two bursts, five bursts, ten bursts, or any other convenient number of liquid bursts to be provided from the cleaning device 410 to the cover or lens 420. Each burst can last for a predetermined duration, such as 0.25 second, 0.5 second, 1.0 second, 2.0 seconds, or any other desired duration.

In other examples, the controller 474 can be configured to cause a continuous liquid stream 404 to be provided from the nozzle 422 to the cover or lens 420 until confirmation is received that dust, dirt, or other debris is removed from the outer surface 430 of the cover or lens 420. For example, the controller 474 can be configured to continue to cause liquid to flow from the liquid reservoir 460 to the nozzle 422 until a control signal is received from the vehicle perception system 482 indicating that the dust, dirt, or other debris has been removed from the outer surface 430 of the lens or cover 420 of the vehicle sensor or camera 470. Once the signal confirming that the dust, dirt, or other debris is no longer present on the outer surface 430 of the cover or lens 420 is received, the controller 474 can be configured to cause liquid flow from the liquid reservoir 460 to the nozzle 422 to cease. For example, the controller 474 can cause the valve 472 between the liquid reservoir 460 and nozzle 422 to move to its closed position. When the valve 472 is closed, as previously described, airflow through the cleaning device housing 412 to the cover or lens 420 continues to occur to direct dirt, dust, and other debris away from the cover or lens 420. However, liquid streams 404 are not provided to the cover or lens 420 until the valve 472 is moved back to its open position.

5. Method of Operation for a Vehicle Sensor Cleaning Device

Figure 5:
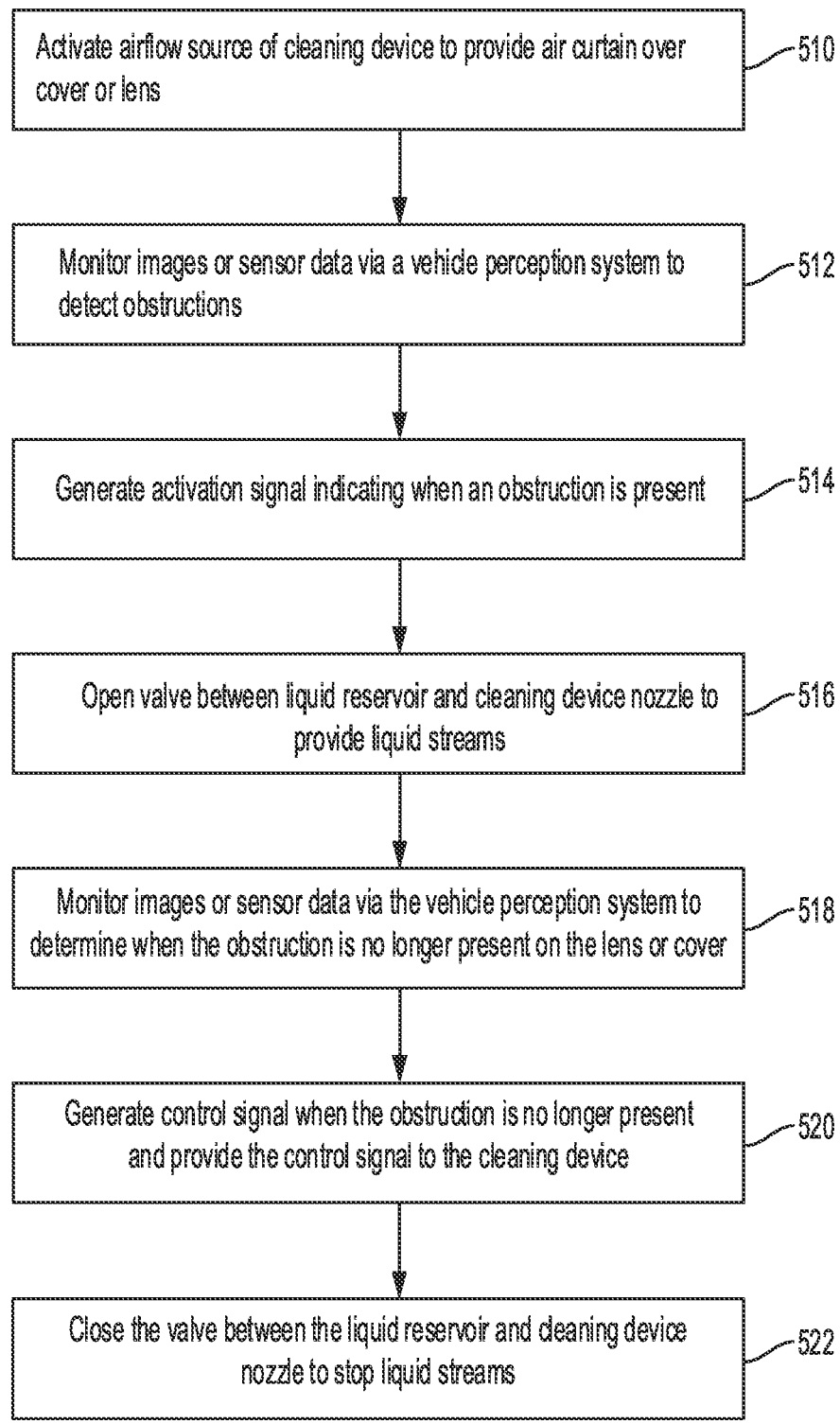
FIG. 5 is a flow chart showing a method of cleaning a cover or lens of a vehicle sensor or camera with the cleaning device of the present disclosure.

FIG. 5 is a flow chart for using or operating a cleaning system or cleaning device, such as any of the previously described cleaning devices 310, 410, for removing an obstruction, such as dirt, dust, or other debris, from an outer surface of a cover or lens of a vehicle sensor or camera. As shown in FIG. 5, the method can initially comprise, at step 510, activating an airflow source of the cleaning device to cause air streams to pass through a passageway of a housing of the cleaning device and over the cover or lens of the vehicle sensor or camera. As previously described, the airflow source can be configured to provide a continuous or substantially continuous air curtain over the cover or lens to deflect or direct dirt, dust, and other debris away from the cover or lens reducing the probability that the cover or lens will become obstructed by the dirt, dust, or other debris.

At step 512, the method can further comprise periodically or continually monitoring images or sensor data obtained from the camera and/or vehicle sensors using a vehicle perception system to determine when an obstruction is present on the cover or lens of the sensor or camera. When an obstruction is detected by the perception system based on analysis of images or sensor data from the camera or vehicle sensors, at step 514, the method further comprises generating an activation signal indicating that the obstruction is present on the cover or lens of the vehicle sensor or camera. In response to the generated activation signal, at step 516, the method can further comprise opening a valve between, for example, a liquid reservoir of the cleaning device and a nozzle of the cleaning device. With the valve in the open position, liquid can flow from the liquid reservoir through the nozzle of the cleaning device. As previously described, in some examples, fluid flows passively from the liquid reservoir to the nozzle by gravity. In other examples, fluid can be actively expelled from the liquid reservoir as a pressurized fluid stream by a piston, plunger, pump, or similar liquid moving device. The liquid from the liquid reservoir is expelled from the nozzle as liquid streams directed towards the cover or lens of the camera or vehicle sensor for cleaning or washing the surface of the cover or lens. As previously described, the liquid streams from the nozzle can be surrounded by and/or combined with the air streams providing a collimated fluid stream from the cleaning device to the cover or lens. The liquid can be expelled as a continuous liquid stream provided for a predetermined period of time. In other examples, liquid can be expelled as one or more short-duration bursts.

At step 518, the method can further comprise, as liquid stream(s) are being applied to the cover or lens, continuing to periodically or continually monitor images or sensor data obtained from the camera and/or vehicle sensors using the vehicle perception system to determine when the obstruction is no longer present on the cover or lens of the sensor or camera. At step 520, the method further comprises generating a control signal when the obstruction is no longer present on the cover or lens and providing the control signal to the cleaning device. At step 522, when the control signal is received, the cleaning device can be configured to close the valve causing the liquid streams to stop flowing from the liquid reservoir through the nozzle. As previously described, even after the liquid streams cease, the airflow source of the cleaning device can continue to provide the air streams or air curtain over the cover or lens to reduce the probability that obstructions, such as dirt, dust, or other debris will adhere to the cover or lens.

6. Computer System for a Vehicle

Figure 6:
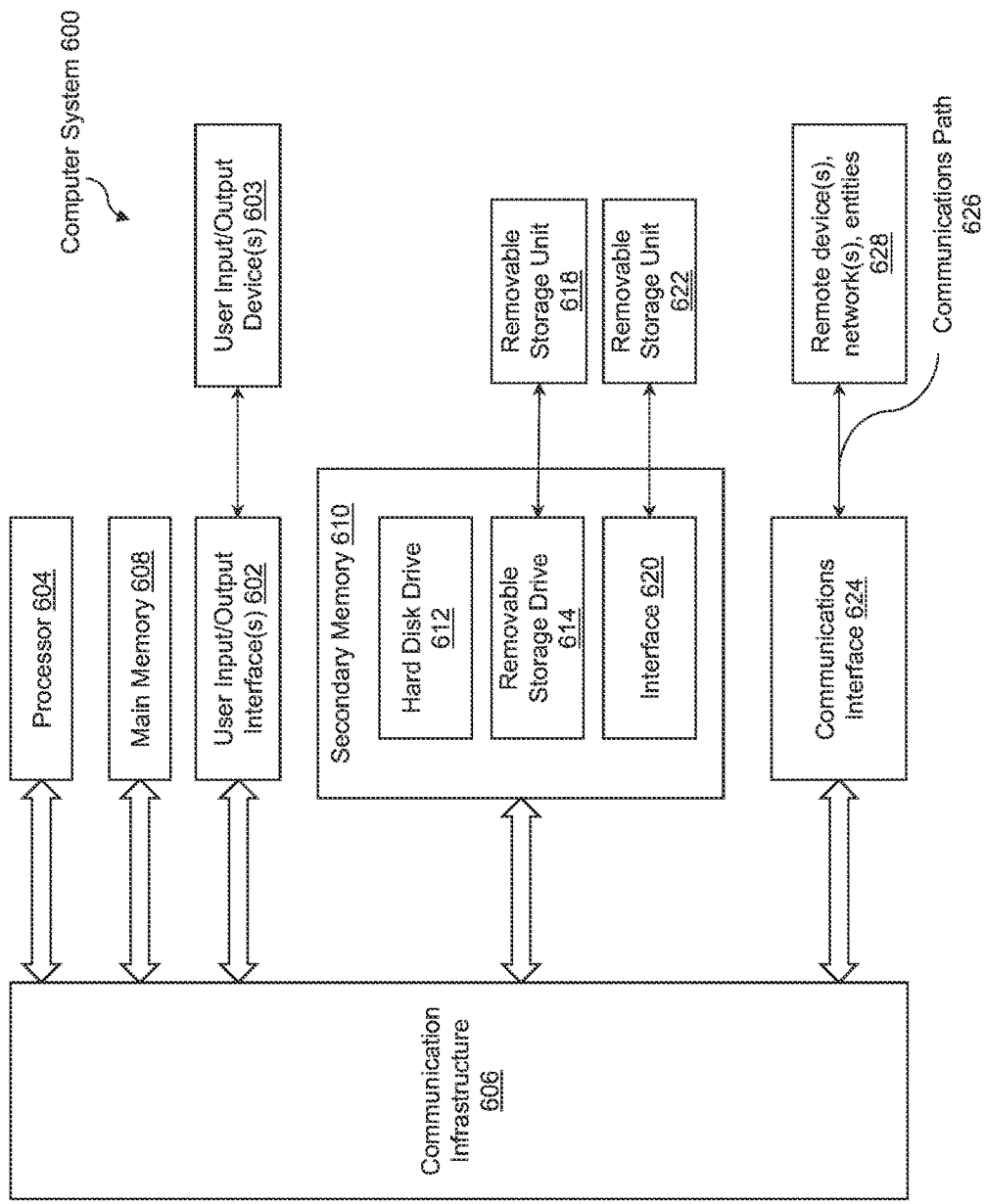
FIG. 6 is a schematic drawing of components of a computer system that can be used with an autonomous or semi-autonomous vehicle, according to an aspect of the present disclosure.

The on-board computing device 220 (shown in FIG. 2) of the vehicle 102*a* can be implemented using a computer system, such as the exemplary computer system 600 shown in FIG. 6. The computer system 600 can be any computer capable of performing the functions described herein. With reference to FIG. 6, the computer system 600 includes one or more processors (also called central processing units, or CPUs), such as a processor 604. The processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 600 also includes user input/output device(s) 603, such as monitors, keyboards, pointing devices, etc., that communicate with communication infrastructure 606 through user input/output interface(s) 603.

The computer system 600 also includes a main or primary memory 608, such as random access memory (RAM). The main memory 608 may include one or more levels of cache. The main memory 608 has stored therein control logic (i.e., computer software) and/or data.

The computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities, or other approaches for allowing computer programs and/or other instructions and/or data to be accessed by computer system 600. Such means, instrumentalities, or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 600 may further include a communication or network interface 624. The communication interface 624 enables computer system 600 to communicate and interact with any combination of remote devices, remote networks, remote entities, etc. (individually and collectively referenced by reference number 628). For example, communication interface 624 may allow the computer system 600 to communicate with remote devices 628 over communications path 626, which may be wired and/or wireless, and which may include any combination of LANs, WANs, the Internet, etc. The control logic and/or data may be transmitted to and from computer system 600 via communication path 626.

In some examples, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618, 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this aspect of the disclosure using data processing devices, computer systems, and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A cleaning device for a vehicle sensor, comprising:
a housing comprising an open first end, an open second end, and a passageway extending between the open first end and the open second end; and
at least one nozzle (i) at least partially positioned within the passageway of the housing such that the housing is disposed over the at least one nozzle and a portion of the passageway forms a space between the nozzle and the housing and (ii) comprising an outlet that provides at least one liquid stream through the open first end of the housing towards a lens or cover of the vehicle sensor,
wherein the housing is positioned such that air streams passing through the passageway pass (i) over an exterior of the at least one nozzle along the space and (ii) through the open first end of the housing towards the lens or cover of the vehicle sensor with the at least one liquid stream.

2. The cleaning device of claim 1, wherein the at least one liquid stream and the air streams pass through the open first end of the housing as a collimated fluid stream.

3. The cleaning device of claim 1, wherein the at least one liquid stream projects through the open first end of the housing in a direction at least substantially parallel to a direction of the air streams passing through the open first end of the housing.

4. The cleaning device of claim 1, wherein the air streams passing through the passageway surround the outlet of the at least one nozzle.

5. The cleaning device of claim 1, wherein the at least one liquid stream passes through a central portion of the open first end of the housing and the air streams pass through peripheral portions of the open first end of the housing.

6. The cleaning device of claim 1, wherein the housing comprises a first housing part with the at least one nozzle mounted to the first housing part, and a second housing part at least partially enclosing the first housing part and the at least one nozzle.

7. The cleaning device of claim 6, wherein the passageway is a space between the first housing part and the second housing part.

8. The cleaning device of claim 1, wherein the open second end of the housing is configured to be connected to an airflow source that moves air through the passageway of the housing.

9. The cleaning device of claim 1, wherein the at least one nozzle comprises an inlet, the outlet, and a liquid channel extending between the inlet and the outlet.

10. The cleaning device of claim 9, wherein the inlet of the at least one nozzle is configured to be fluidly connected to a liquid reservoir, and
wherein liquid passes from the liquid reservoir through the liquid channel as a pressurized fluid stream.

11. A sensor assembly, comprising:
a housing comprising an open first end, an open second end, and a passageway extending between the open first end and the open second end;
at least one nozzle (i) at least partially positioned within the passageway of the housing such that the housing is disposed over the at least one nozzle and a portion of the passageway forms a space between the nozzle and the housing and (ii) comprising an outlet that projects at least one liquid stream through the open first end of the housing; and
at least one camera lens or cover protruding through a camera opening in the housing,
wherein the at least one nozzle and the housing are positioned such that the at least one liquid stream passes through the open first end of the housing towards an outer surface of the at least one camera lens, and
wherein air streams passing through the passageway pass (i) over an exterior of the at least one nozzle along the space and (ii) through the open first end of the housing towards the at least one camera lens along with the at least one liquid stream.

12. The sensor assembly of claim 11, wherein the at least one camera lens comprises a convex outer surface.

13. The sensor assembly of claim 12, wherein the at least one liquid stream expelled from the at least one nozzle is directed towards a side portion of the convex outer surface of the at least one camera lens between a peripheral edge of the convex outer surface and a center of the convex outer surface.

14. The sensor assembly of claim 13, wherein the at least one nozzle is at a twelve o'clock position relative to the at least one camera lens.

15. The sensor assembly of claim 13, wherein the air streams direct liquid of the at least one liquid stream over the convex outer surface of the at least one camera lens, such that the liquid passes over both the side portion of the convex outer surface nearest to the at least one nozzle and the side portion of the convex outer surface that is farthest away from the at least one nozzle.

16. The sensor assembly of claim 15, wherein the housing comprises a first housing part, with the at least one nozzle mounted to the first housing part, and a second housing part at least partially enclosing the first housing part and the at least one nozzle,
wherein the passageway is a space between the first housing part and the second housing part, and
wherein a camera is enclosed within the first housing part with a field of view of the camera passing through the at least one camera lens.

17. A sensor system, comprising:
a cleaning device for a vehicle sensor, comprising
a housing comprising an open first end, an open second end, and a passageway extending between the open first end and the open second end, and
at least one nozzle (i) at least partially positioned within the passageway of the housing such that the housing is disposed over the at least one nozzle and a portion of the passageway forms a space between the nozzle and the housing and (ii) comprising an inlet, an outlet that projects at least one liquid stream through the open first end of the housing towards a lens or cover of the vehicle sensor, and a channel extending between the inlet and the outlet;

a liquid reservoir fluidly connected to the inlet of the at least one nozzle containing liquid to be ejected from the outlet of the at least one nozzle forming the at least one liquid stream;

an airflow source connected to the open second end of the housing for moving air through the passageway of the housing; and a controller configured to selectively activate the airflow source to move the air through the passageway, wherein the housing is positioned such that air streams passing through the passageway pass (i) over an exterior of the at least one nozzle along the space and (ii) through the open first end of the housing towards the lens or cover of the vehicle sensor with the at least one liquid stream.

18. The sensor system of claim 17, wherein the controller is further configured to periodically cause liquid to be ejected from the outlet of the at least one nozzle.

19. The sensor system of claim 17, further comprising a valve between the liquid reservoir and the inlet of the at least one nozzle, wherein the controller is configured to cause the valve to open to cause the liquid to flow from the liquid reservoir to the at least one nozzle.

20. The sensor system of claim 17, wherein the controller is configured to receive an activation signal from a perception system of the vehicle and to cause the liquid to pass from the liquid reservoir to the at least one nozzle in response to the received activation signal.

* * * * *